(12) United States Patent
Matthews et al.

(10) Patent No.: US 9,203,723 B2
(45) Date of Patent: Dec. 1, 2015

(54) NETWORK TRACING FOR DATA CENTERS (71) Applicant: Broadcom Corporation, Irvine, CA (US)

(72) Inventors: William Brad Matthews, San Jose, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/839,501

(22) Filed: Mar. 15, 2013

(65) Prior Publication Data

US 2014/0211639 A1     Jul. 31, 2014

Related U.S. Application Data

(60) Provisional application No. 61/758,353, filed on Jan. 30, 2013.

(51) Int. Cl.
*H04L 12/26*     (2006.01)
*H04L 12/939*     (2013.01)

(52) U.S. Cl.
CPC ............ *H04L 43/10* (2013.01); *H04L 12/2697* (2013.01); *H04L 43/50* (2013.01); *H04L 49/555* (2013.01); *H04L 43/0817* (2013.01); *H04L 43/16* (2013.01)

(58) Field of Classification Search
CPC ..... H04L 43/0817; H04L 43/16; H04L 43/10; H04L 47/10
USPC ......................................................... 370/250
See application file for complete search history.

(56) References Cited

U.S. PATENT DOCUMENTS

2005/0099948 A1 *    5/2005    Wakumoto et al. ........... 370/236
2011/0103238 A1 *    5/2011    Monk et al. .................... 370/252

OTHER PUBLICATIONS

Definition of "traceroute," Wikipedia, Wikimedia Foundation, Inc., Jan. 22, 2013 (4 pages).

* cited by examiner

*Primary Examiner* — Jae Y Lee
*Assistant Examiner* — Jean F Voltaire
(74) *Attorney, Agent, or Firm* — Brinks Gilson & Lione (57) ABSTRACT

Network devices facilitate network tracing using tracing packets that travel through the network devices. The network devices may be switches, routers, bridges, hubs, or any other network device. The network tracing may include sending tracing packets down each of multiple routed paths between a source and a destination, at each hop through the network, or through a selected subset of the paths between a source and a destination. The network devices may add tracing information to the tracing packets, which an analysis system may review to determine characteristics of the network and the characteristics of the potentially many paths between a source and a destination.

20 Claims, 9 Drawing Sheets

NETWORK TRACING FOR DATA CENTERS

1. PRIORITY CLAIM

This application claims priority to U.S. Provisional Application Ser. No. 61/758,353, filed Jan. 30, 2013, titled "Network Tracing For Data Centers," which is incorporated herein by reference in its entirety.

2. TECHNICAL FIELD

This disclosure relates to networking. This disclosure also relates to tracing multiple available routes from a source to a destination in a multi-hop, multi-path network.

3. BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in understanding the connectivity and path characteristics from the source to the destination will help improve high speed data networks.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Example Architecture

Figure 1:
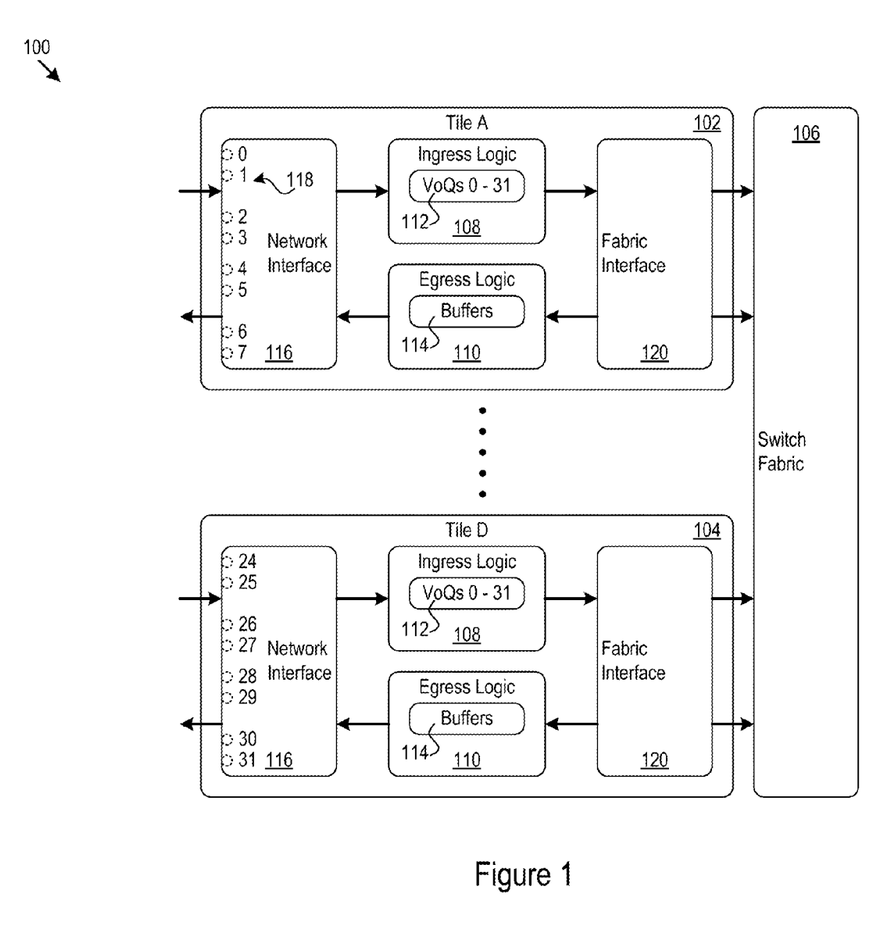
FIG. 1 shows an example of a switch architecture that may include network tracing functionality.

FIG. 1 shows an example of a switch architecture 100 that may include network tracing functionality. The description below provides a backdrop and a context for the explanation of network tracing, which follows the example architecture description. Furthermore, the description below provides examples of detailed network path characteristics that may be monitored by network tracing and by adding tracing information into packets that traverse the network. Accordingly, the example architecture 100 is presented as just one of many possible network device architectures that may include network tracing functionality, and the example provided in FIG. 1 is one of many different possible alternatives. The techniques described further below are not limited to any specific device architecture.

The architecture includes several tiles, e.g., the tiles specifically labeled as tile A 102 and the tile D 104. In this example, each tile has processing logic for handling packet ingress and processing logic for handling packet egress. A switch fabric 106 connects the tiles. Packets, sent for example by source network devices such as application servers, arrive at the network interfaces 116. The network interfaces 116 may include any number of physical ports 118. The ingress logic 108 buffers the packets in memory buffers. Under control of the switch architecture 100, the packets flow from an ingress tile, through the fabric interface 120 through the switching fabric 106, to an egress tile, and into egress buffers in the receiving tile. The egress logic sends the packets out of specific ports toward their ultimate destination network device, such as a destination application server.

Each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queueing, processing, and transmission of packets received and sent over the ports associated with that tile.

As an example, in FIG. 1 the tile A 102 includes 8 ports labeled 0 through 7, and the tile D 104 includes 8 ports labeled 24 through 31. Each port may provide a physical interface to other networks or network devices, such as through a physical network cable (e.g., an Ethernet cable). Furthermore, each port may have its own line rate (i.e., the rate at which packets are received and/or sent on the physical interface). For example, the line rates may be 10 Mbps, 100 Mbps, 1 Gbps, or any other line rate.

The techniques described below are not limited to any particular configuration of line rate, number of ports, or number of tiles, nor to any particular network device architecture. Instead, the tracing techniques described below are applicable to any network device that incorporates the tracing logic described below. The network devices may be switches, routers, bridges, blades, hubs, or any other network device that handle routing packets from sources to destinations through a network. The network devices are part of one or more networks that connect, for example, application servers together across the networks. The network devices may be present in one or more data centers that are responsible for routing packets from a source to a destination.

The tiles include packet processing logic, which may include ingress logic 108, egress logic 110, tracing logic, and any other logic in support of the functions of the network device. The ingress logic 108 processes incoming packets, including buffering the incoming packets by storing the packets in memory. The ingress logic 108 may define, for example, virtual output queues 112 (VoQs), by which the ingress logic 108 maintains one or more queues linking packets in memory for the egress ports. The ingress logic 108 maps incoming packets from input ports to output ports, and determines the VoQ to be used for linking the incoming packet in memory. The mapping may include, as examples, analyzing addressee information in the packet headers, and performing a lookup in a mapping table that matches addressee information to output port(s).

The egress logic 110 may maintain one or more output buffers 114 for one or more of the ports in its tile. The egress logic 110 in any tile may monitor the output buffers 114 for congestion. When the egress logic 110 senses congestion (e.g., when any particular output buffer for any particular port is within a threshold of reaching capacity), the egress logic 110 may throttle back its rate of granting bandwidth credit to the ingress logic 108 in any tile for bandwidth of the congested output port. The ingress logic 108 responds by reducing the rate at which packets are sent to the egress logic 110, and therefore to the output ports associated with the congested output buffers.

The ingress logic 108 receives packets arriving at the tiles through the network interface 116. In the ingress logic 108, a packet processor may perform link-layer processing, tunnel termination, forwarding, filtering, and other packet processing functions on the received packets. The packets may then flow to an ingress traffic manager (ITM). The ITM writes the packet data to a buffer, from which the ITM may decide whether to accept or reject the packet. The ITM associates accepted packets to a specific VoQ, e.g., for a particular output port. The ingress logic 108 may manage one or more VoQs that are linked to or associated with any particular output port. Each VoQ may hold packets of any particular characteristic, such as output port, class of service (COS), priority, packet type, or other characteristic.

The ITM, upon linking the packet to a VoQ, generates an enqueue report. The tracing logic, described below, may receive the enqueue report as a signal that a new packet has arrived that may be a tracing packet, and that may cause the tracing logic to further annotate the arrived packet with tracing information, generate additional tracing packets sent over outgoing routed connections, or take other tracing actions. The ITM may also send the enqueue report to an ingress packet scheduler. The enqueue report may include the VoQ number, queue size, and other information. The ITM may further determine whether a received packet should be placed on a cut-through path or on a store and forward path. If the receive packet should be on a cut-through path, then the ITM may send the packet directly to an output port with as low latency as possible as unscheduled traffic, and without waiting for or checking for any available bandwidth credit for the output port. The ITM may also perform packet dequeueing functions, such as retrieving packets from memory, forwarding the packets to the destination egress tiles, and issuing dequeue reports. The ITM may also perform buffer management, such as admission control, maintaining queue and device statistics, triggering flow control, and other management functions.

In the egress logic 110, packets arrive via the fabric interface 120. A packet processor may write the received packets into an output buffer 114 (e.g., a queue for an output port through which the packet will exit) in the egress traffic manager (ETM). Packets are scheduled for transmission and pass through an egress transmit packet processor (ETPP) and ultimately out of the output ports.

The ETM may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM may also perform packet enqueue/dequeue, by processing enqueue requests coming from the ERPP to store incoming frames into per egress port class of service (CoS) queues prior to transmission (there may be any number of such CoS queues, such as 2, 4, or 8) per output port.

The ETM may also include an egress packet scheduler to determine packet dequeue events, resulting in packets flowing from the ETM to the ETPP. The ETM may also perform egress packet scheduling by arbitrating across the outgoing ports and COS queues handled by the tile, to select packets for transmission; flow control of egress credit scheduler (ECS), by which, based on total egress tile, per egress port, and per egress port and queue buffer utilization, flow control is sent to the ECS to adjust the rate of transmission of credit grants (e.g., by implementing an ON/OFF type of control over credit grants); flow control of tile fabric data receive, through which, based on total ETM buffer utilization, link level flow control is sent to the fabric interface 120 to cease sending any traffic to the ETM.

Network Tracing

Figure 2:
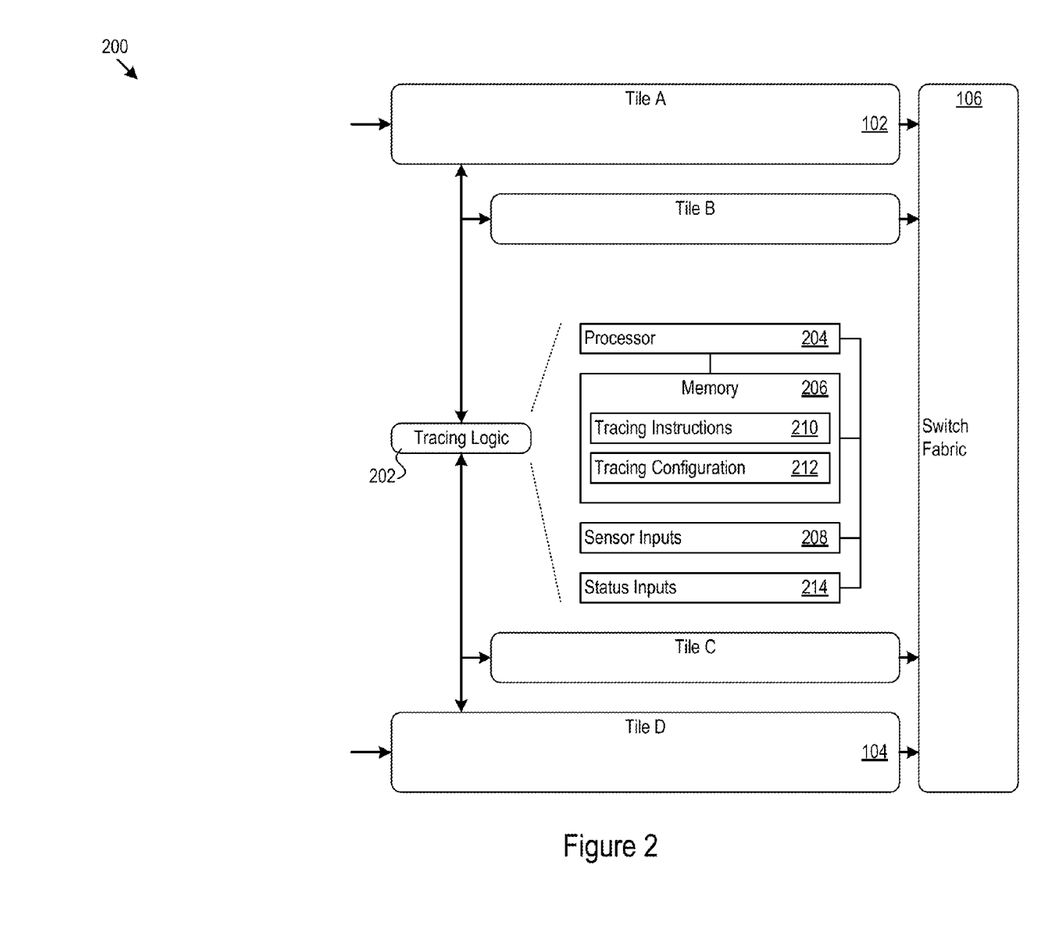
FIG. 2 is an example switch architecture extended to include network tracing logic.

FIG. 2 shows an example architecture 200 which is extended to include the tracing logic 202. The tracing logic 202 may be implemented in any combination of hardware, firmware, and software. The tracing logic 202 may be implemented at any one or more points in the architecture 100, or in other architectures of any network device. As examples, the tracing logic 202 may be a separate controller or processor/memory subsystem. The tracing logic 202 may be incorporated into, and share the processing resources of the ingress logic 108, egress logic 110, fabric interfaces 120, network interfaces 116, or switch fabric 106.

In the example of FIG. 2, the tracing logic 202 includes a processor 204, a memory 206, sensor inputs 208, and status inputs 214. The tracing logic 202 will execute network tracing with respect to the set of possible paths that can be taken to reach a destination device. The tracing logic 202 may create tracing packets, insert tracing information into the tracing packets, and add, at any point in the architecture, the tracing packets into the packet stream passing through the network device. The tracing logic 202 may create tracing packets by replication of a received packet (e.g., a tracing packet received from another network device) or by creation of the tracing packet without replication or reference to other extant packets. In some implementations, the processor 204 executes the tracing instructions 210 to execute network tracing. The tracing logic 202 may obtain the tracing information from the sensor inputs 208, status inputs 214, or any other information available to the tracing logic 202.

The tracing configuration information 212 may guide the operation of the tracing logic 202. For example, the tracing configuration information 212 may specify when, how frequently or on what schedule, and under what conditions or in response to which events to execute or to terminate network tracing. In that regard, the tracing configuration information 212 may include any number of tracing criteria specifying when and/or whether to execute or terminate network tracing. As additional examples, the tracing configuration information 212 may also specify what information to include or exclude as tracing information, and when to do so, how to add the tracing information (e.g., where to place the tracing information in the packet), or any other tracing operational parameters.

The sensor inputs 208 may provide, for example, environmental information to the tracing logic 202. As examples, the sensor inputs 208 may be temperature, voltage, current, power consumption, vibration, shock, moisture, humidity, fan speed, or other sensor inputs. The network device may add as tracing information any of the information received at the sensor inputs 208. The sensors may report information for the network device as a whole (e.g., currently at 20 Watts of power consumption), or for any one part or multiple parts of the network device at any desired granularity. Several examples include: power consumption for tile A (e.g., 2 W), power consumption for tile B (e.g., 3.5 W), Fan speed (e.g., Fan 1 speed=1500 RPM, Fan speed 2=4000 RPM), Tile C ingress logic current draw (e.g., 400 ma), or any other sensed data.

The status inputs 214 may provide, for example, status information about the operation of the network device. As examples, the status inputs may provide a device identifier for the network device, or may convey VoQ fill levels (or other ingress buffer levels) or sizes, egress buffer levels or sizes, queue levels or sizes for any other intermediate queues, or queue levels and sizes for output queues for shared memory or output buffered device. As additional examples, the status inputs may convey network device loading data, packet arrival times at the network device, packet departure times from the network device, the number of packets received at one or more input ports or transmitted out of one or more output ports over any specified time period, and switching delay times (or other measures of latency) for any particular packet, e.g., as an average over all packets or a specified subset of packets. Yet another example is the amount of traffic flow on members of an aggregation group of links, and, as just one example, link imbalance beyond an imbalance threshold may trigger tracing of packets with the traffic flow data for analysis by a downstream analysis system. Any network device may also implement a 'user defined' data field in the tracing information for reporting data selected, defined, or otherwise specified to the network device. The status inputs 214 may provide a current status for any of the information discussed above, historical status (e.g., over the past 2 hours, 3 days, week, month, etc.), or both.

Tracing may occur at each hop of a packet through a network. The hop may be, for example, entry of a packet into a network device and exit of the packet from the network device. The tracing information may include, as further examples, network device identifiers, number of hops traversed so far, the hash value of the packet header, payload, or both, routing/path selection criteria or decision variables, and network device configuration settings.

In many instances, the tracing information is network device information that is otherwise unknown or unavailable to, as examples, the source application server and to the destination application server. In other words, the tracing information provides a unique view into the status and operation of the network device itself. Examples of such tracing information include ingress or egress buffer fill levels, switch power consumption, and hop delay through the switch. As a result, the tracing information provides a new level of insight into the network operation. As will be described in detail below, the tracing information may drive informative dashboards displayed, e.g., at an analysis system. The analysis system may then push adaptations back to the network devices upon analysis of the tracing information.

Packets typically include a header and a payload. Either section of the packet may hold tracing information. The tracing logic 202 adds the tracing information in data fields in the packet at any point in the processing of the packet in the network device. As example, the network device may add tracing information to a packet when the packet is in the ingress buffers 108, in the egress buffers 110, at the fabric interface 120, in the switching fabric 106, or at the network interface 118. Accordingly, the packet destination, e.g., an application server, may benefit from the deep insight into the network provided by the tracing information.

In most data centers, multiple network devices (e.g., switches and routers) are interconnected and create many different possible multi-path, multi-hop paths from a source (e.g., a source server) to a destination (e.g., a destination server). The number of different possible paths is a function of the connectivity of the network devices and/or routing algorithms and methods employed by the network devices. Further, any network device may implement routing information such as routing tables that define routed paths, from among all of the possible physical paths, from that network device toward a destination device. Thus, there may be many more physical paths than routable paths that a packet can traverse from a source to a destination. A network device may determine the routable paths by examining its routing tables and other routing information.

In operation, the tracing logic 202 may determine the multiple paths (e.g., the routed paths) along which a packet may travel from the network device toward the destination device. Despite routing information in the network device specifying a particular path for the packet to the destination device, the tracing logic 202 may determine a selection of paths from among the multiple paths for tracing. The tracing logic 202 may then send an outgoing network tracing packet down each path of the selection of paths. This process may occur at one or more network devices. As a result, tracing packets may, in effect, fan out at each hop to traverse multiple possible paths toward the destination device.

The tracing configuration information 212 may implement controls over the degree or extent of the network tracing. As one example, the tracing configuration information 212 may define a destination based constraint, such as specifying a limit on the number of the available paths down which to send tracer packets. A specific example include sending tracer packets down a maximum of 4 available paths, which the tracing logic may choose in the order found, in a random order, in an order specified according to ranks or weights given to particular next hops, in an order specified by an operator, or in other ways.

As another example of network tracing control, the tracing configuration information 212 may be hop-based. For example, the hop-based constraint may limit the tracing operation to: the first 'n' consecutive hops through the network, the last 'm' hops through the network, hops 'a' through 'b' through the network, or hops through a specified set of network devices. As another example of hop-based constraint, tracing may be allowed to start after 'k' hops have been traversed.

Additional examples of network tracing control include traffic and device controls. For example, the tracing logic 212 may read the tracing configuration information 212 to determine that network tracing should happen when a buffer fill level exceeds a predefined buffer threshold. As another example, the tracing logic 212 may determine that network tracing should happen when latency through the network device exceeds a latency threshold. More generally, any of the inputs from the sensors inputs 208 (e.g., temperature) and status inputs 214 may drive decisions by the tracing logic 212 about whether to start, stop, or continue network tracing, and how to perform network tracing.

Figure 3:
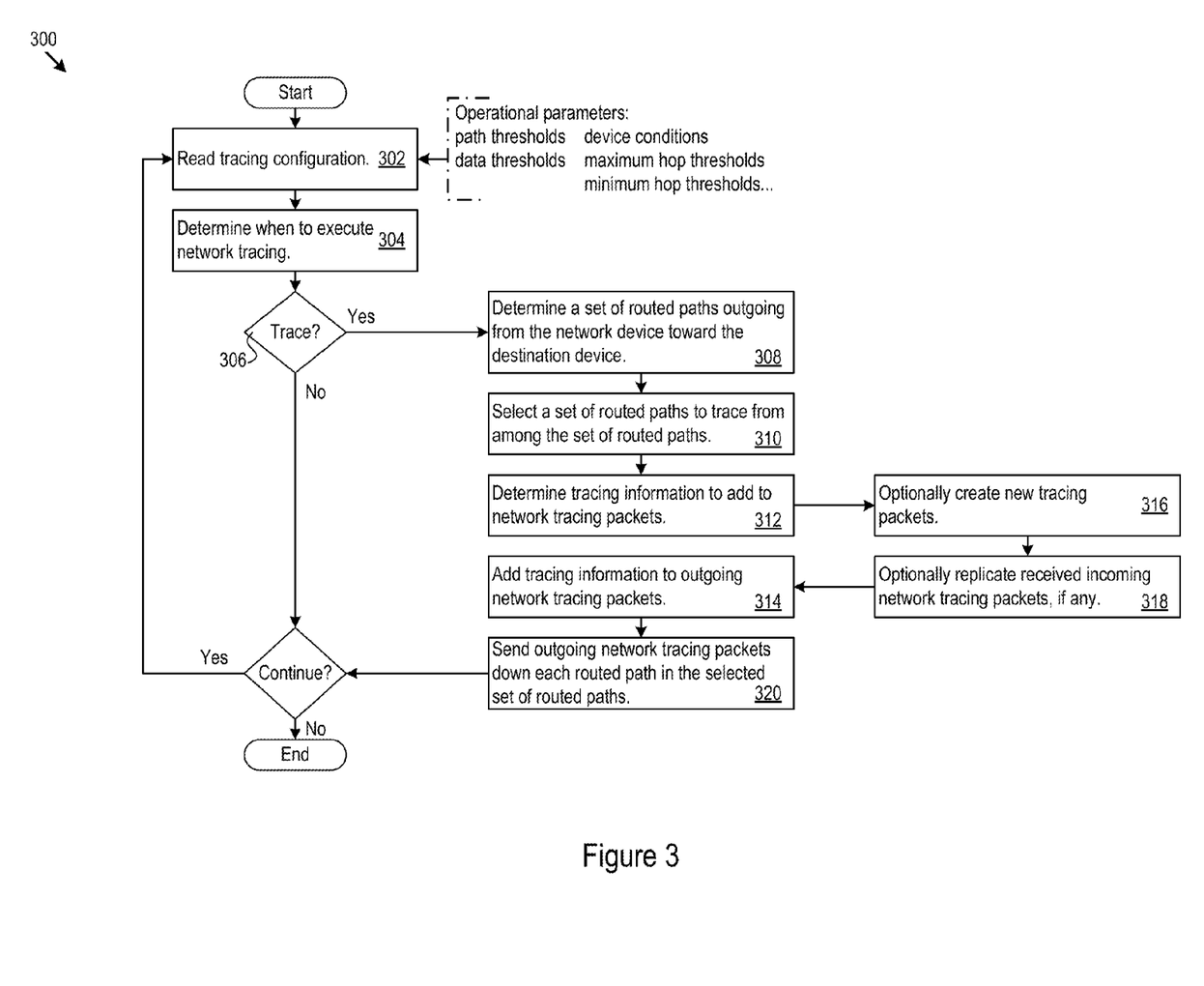
FIG. 3 shows an example of logic for network tracing.

FIG. 3 shows an example of logic 300 that the tracing logic 202 may implement to execute network tracing. The tracing logic 202 reads the tracing configuration 212 (302) and determines when to execute network tracing (304). As noted above, the tracing configuration 212 may specify operational parameters, including the conditions under which to execute network tracing. The operational parameters may also define constraints on how many routed paths may be present in the selection of routed paths to trace (as examples, trace all routed paths, or trace no more than 50% of the routed paths (or any other path threshold), or generate no more than 100 KB of tracing packets (or any other data threshold)).

As another example, the tracing configuration 212 may constrain how many consecutive hops an outgoing network tracing packet may take. The tracing logic 202 may read the hop count from a received tracing packet, and, e.g., as long as the hop count is less than a maximum hop threshold (e.g., 10 hops), may replicate and forward the received network tracing packet down a selected set of outgoing paths. Similarly, the tracing configuration 212 may specify to execute network tracing after a specified number of hops have already happened toward reaching the destination network device (e.g., after 3 hops, or some other minimum hop threshold). Either or both of a maximum hop threshold and a minimum hop threshold may be in effect in any given network device.

The tracing configuration 212 may also specify to execute network tracing when a device condition has been met with respect to an operational parameter of the network device. As examples, the tracing configuration 212 may specify, as device conditions, that a buffer level has exceeded a buffer threshold, latency through the network device has exceeded a latency threshold, power consumption in the network device has exceeded a power consumption threshold, or any other device condition.

When the network device determines to execute network tracing (306), the tracing logic 202 determines a set of routed paths outgoing from the network device toward the destination device (308). From the set of routed paths, the tracing logic may select a set of routed paths to trace from among the set of routed paths. The selected set of routed paths may be all of the outgoing paths, or fewer than all of the outgoing paths. The tracing logic 202 may then determine tracing information (if any) to add to the network tracing packets that it will send. The tracing information may include any of the data obtained from the sensor input 208, or status inputs 214, or other information such as network device identifiers, hop counts, latency through the network device, buffer levels, or traced path selection criteria, to continue the examples given above.

The tracing logic 202 adds tracing information to outgoing network tracing packets (314). The outgoing network tracing packets may be obtained in several different ways, which may be used alone or in combination. As one example, the tracing logic 202 may create new tracing packets internally (316) (e.g., that are not based on prior tracing packets, received from prior devices along the path to the destination device). The tracing logic 202 may thereby inject new tracing packets into various outgoing network flows. As another example, the tracing logic 202 may replicate in whole or in part a received incoming network tracing packet, optionally modify the replicated packet (e.g., to add and/or update tracing information), and use the optionally modified replicated tracing packets as the outgoing network tracing packets (318). The tracing logic 202 sends the outgoing network tracing packets down each routed path in the selected set of routed paths (320).

Figure 4:
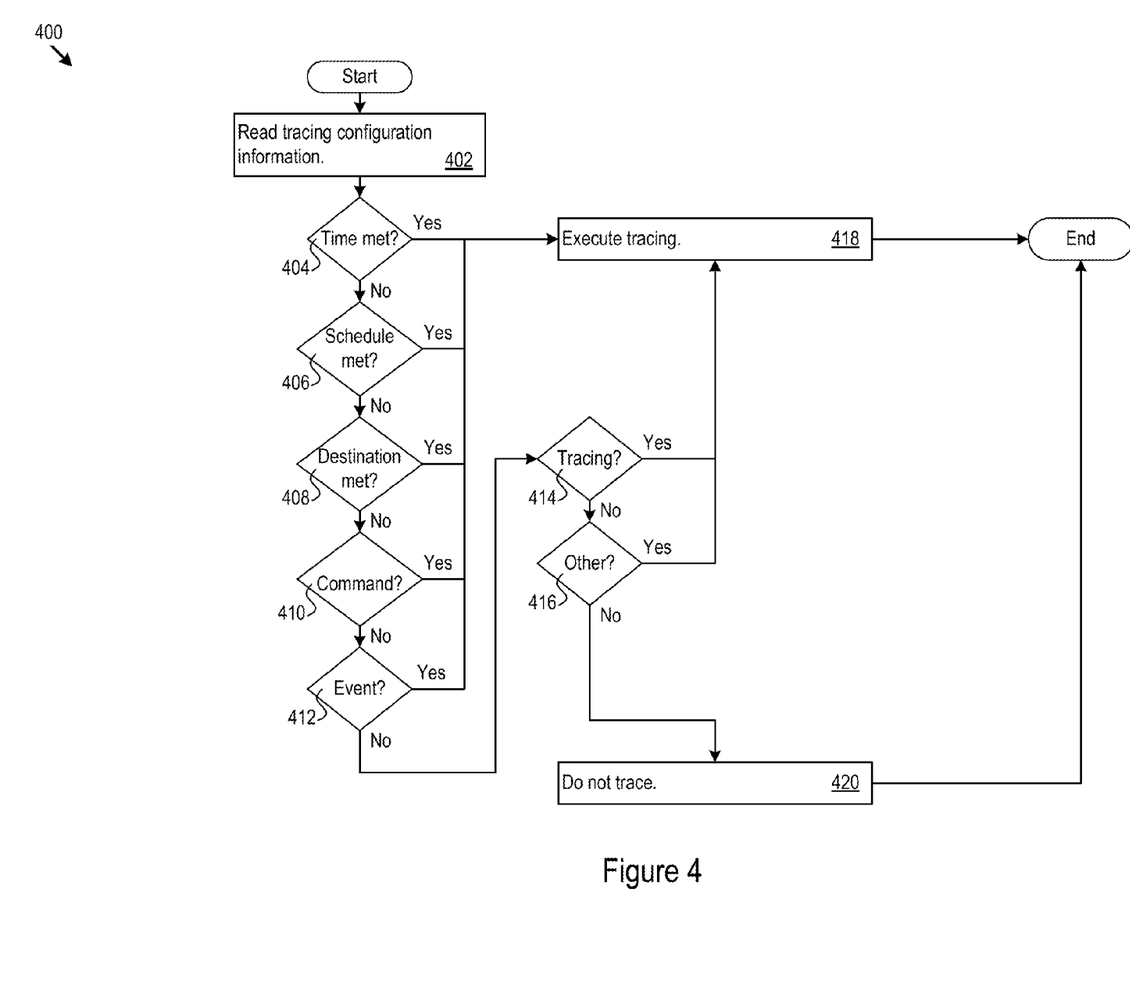
FIG. 4 shows an example of logic for deciding when to execute network tracing.

FIG. 4 shows an example of logic 400 that the tracing logic 202 may implement to decide when to execute network tracing (418) or forgo network tracing (420). The tracing logic 202 reads tracing configuration information 212 (402), described above. The tracing logic 202 may determine, as one example, whether a particular time criteria (404) is met. The time criteria may be, for instance, that routed paths to one or more selected destinations will be traced at a specific time and date. As another example, the logic 400 may determine whether a tracing schedule (406) is met for executing network tracing. For instance, the tracing schedule may specify that every 2nd, 3rd, 10th, or nth received packet will cause network tracing, or that network tracing will occur every nth unit of time, e.g., every 1 msec, 10 msec, 5 s, or 10 minutes. The tracing schedule may establish periodic or aperiodic (e.g., random) tracing.

The network device may execute network tracing based on destination or source device (408). Thus, for example, the network device may execute network tracing for a traffic flow bound for a specified destination, or arriving from a particular source. Alternatively, the network device may annotate packets at certain times or on certain tracing schedules that are bound for a particular destination. As yet another example, the network device may execute network tracing whenever a management command received at the network device instructs the network device to do so (410).

Tracing criteria may be event based (412). As an example of event driven tracing, the network device may execute network tracing when specified input or output buffers exceed specified buffer thresholds. As another example, the network device may execute network tracing when power consumption as a whole or by any element in the network device (e.g., tile A) exceeds a power tracing threshold.

In some cases, network devices prior (e.g., upstream) to the network device in question have already begun network tracing, and send outgoing network tracing packets that the network device in question has received (414). When the network device recognizes an incoming packet as a network tracing packet, the network device may continue the tracing operation as noted with respect to FIG. 3. Accordingly, depending on the network topology and defined routes and the sequence of network devices between the source and the destination, there may arise a coverage pattern of network tracing packets that flow through all or some selected subset of possible paths from a source to a destination. At the destination, the network tracing packets are received and recognized, and the destination (or some other analysis system) may analyze the network tracing packets to determine characteristics of the specific routes through the network. To recognize a received packet as a tracing packet, the network device may, as examples, locate a particular data pattern or identifier (e.g., in the packet header or payload) in the received packet. Any other network tracing criteria may be specified (416), including random network tracing.

Figure 5:
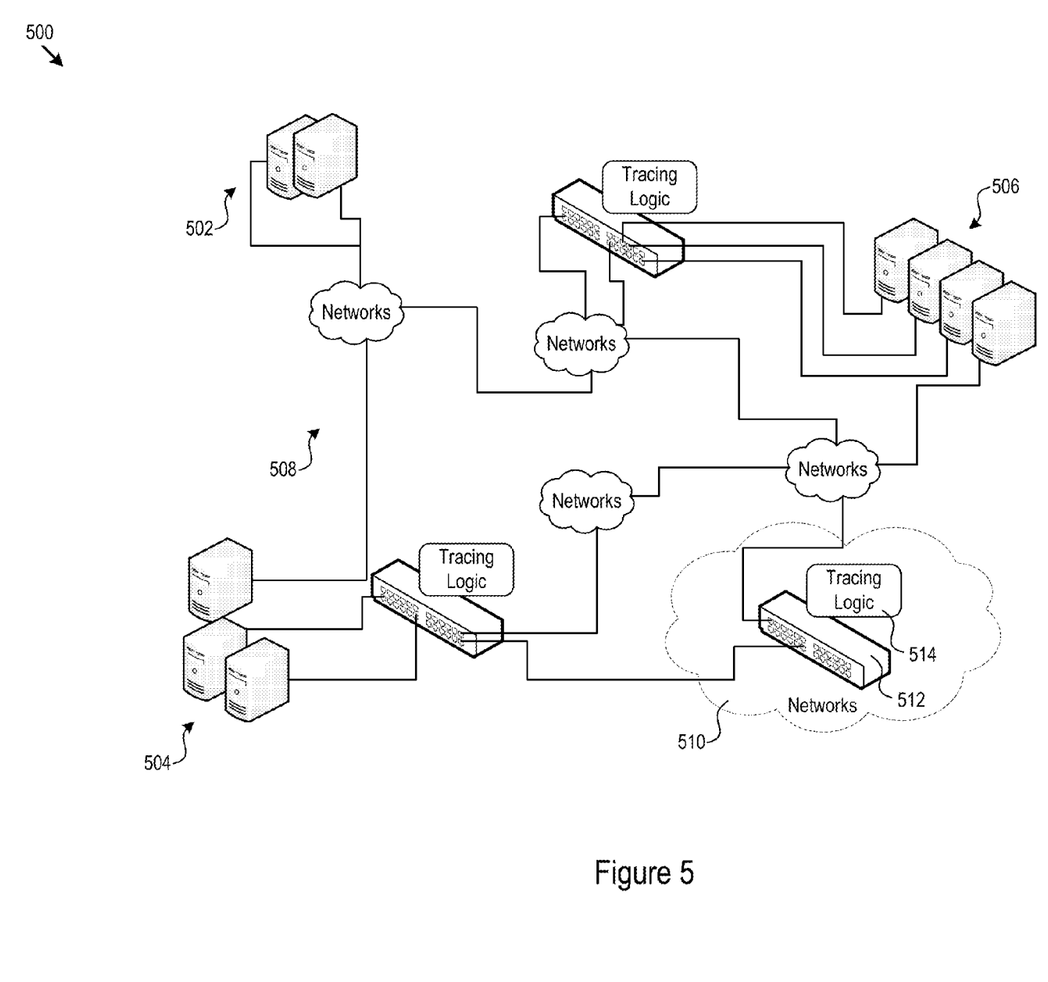
FIG. 5 shows an example communication system in which networked devices communicate with one another.

FIG. 5 shows an example communication system 500 in which networked devices communicate with one another. In the example of FIG. 5, source application servers (e.g., the application servers 502 and 504) communicate with destination application servers (e.g., the destination application servers 506) through an interconnection of networks 508.

As an example, a specific network 510 is labeled among the interconnection of networks 508. The network 510 includes network devices, such as switches, routers, and hubs. The switch 512 is an example of one of the network devices. The switch 512 includes network tracing logic 514, which may be implemented, for example, as shown in FIGS. 2, 3, and 4. Furthermore, tracing logic may be present in any network device located anywhere within the networks 508. Accordingly, as packets travel through any network device that includes tracing logic, the network devices may selectively execute network tracing.

Figure 6:
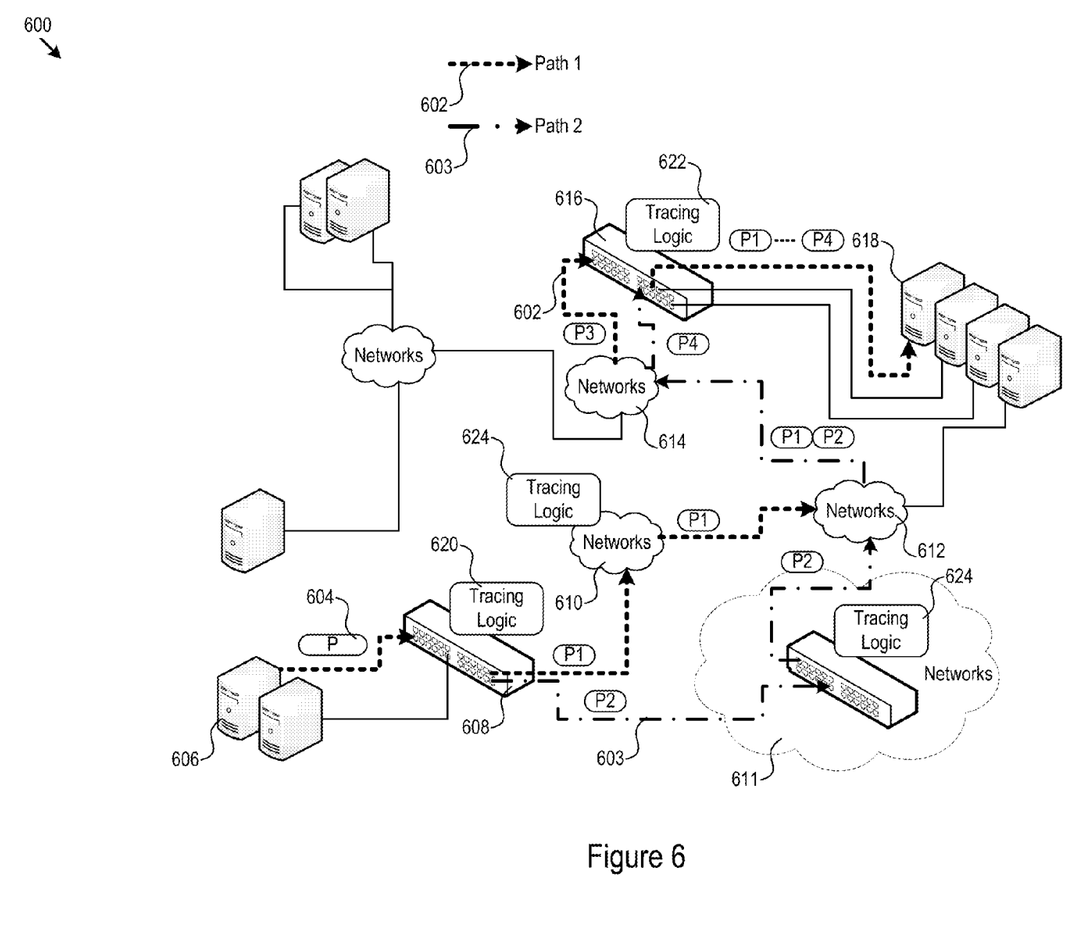
FIG. 6 shows an example of network tracing in a communication system.

FIG. 6 continues the example of FIG. 5 and also shows an example communication system 600 in which networked devices communicate with one another. FIG. 6 shows multiple paths 602 and 603 through the network that may be taken by a packet 604 to travel from the source device 606 to the destination device 618. The path 602 starts at the application server 606, progresses through the switch 608 and the intermediate networks 610, 612, and 614. The path 602 continues through the switch 616 and terminates at the application server 618. The path 603 (as with path 602) also starts at the application server 606, progresses through the switch 608 and the intermediate networks 611, 612, and 614. The path 603 (as with path 602) also continues through the switch 616 and terminates at the application server 618.

At various points along the path, tracing logic is present. For example, the switch 608 includes tracing logic 620 and the switch 616 includes tracing logic 622. The networks 610 and 611 (and others) may also include tracing logic 624, which may be present inside of any switch, router, or other network device in the networks 610 and 611.

As shown in FIG. 6, the packet 604 begins without network tracing, and travels from the source 606 to the switch 608. The switch 608 determines to execute network tracing. As a result, switch 608 sends an outgoing network tracing packet down the next hop to cover both routed paths 602 and 603. The outgoing network tracing packets (e.g., replicated versions of the packet 604), labeled P1 and P2, may include the same or different tracing information, added by the switch 608. In this example, the two paths 602 and 603 come together again through the network 612, and thus both network tracing packets P1 and P2 reach the network 614.

There are two different paths from the network 614 through the switch 616 to the destination 618. In the example shown in FIG. 6, a network device in the network 614 has sent network tracing packets P3 and P4 down both paths to the switch 616. The outgoing network packets P1-P4, bearing tracing information that characterizes the paths from the source 606 to the destination 618, thus reach the destination 618. In other implementations, a network device adds its tracing information to received network tracing packets (which may already bear other tracing information) and sends those modified tracing packets down one or more paths to the next hop. In other words, it is not necessary for a network device to create or replicate new packets for every outgoing path, but instead the network device may reuse existing received network tracing packets. As a specific example, instead of generating a separate packet P3, the network device may reuse P1 or P2 as the outgoing network tracing packet, and optionally add its tracing information to that already present in P1 or P2.

Tracing Information Analysis and Network Adaptation

An analysis system may analyze the tracing information in any of the network tracing packets. The analysis may lead to network adaptation. In particular, the tracing information provides deeper insight into the operation of the network, often including information that is simply not otherwise available to the application servers, or other higher level entities. As a result, for example, any system that receives the tracing information, including application servers, may receive, analyze, and send adaptation commands to aid in the understanding of the network operation, and to guide the operation of the network devices and the network as a whole.

Figure 7:
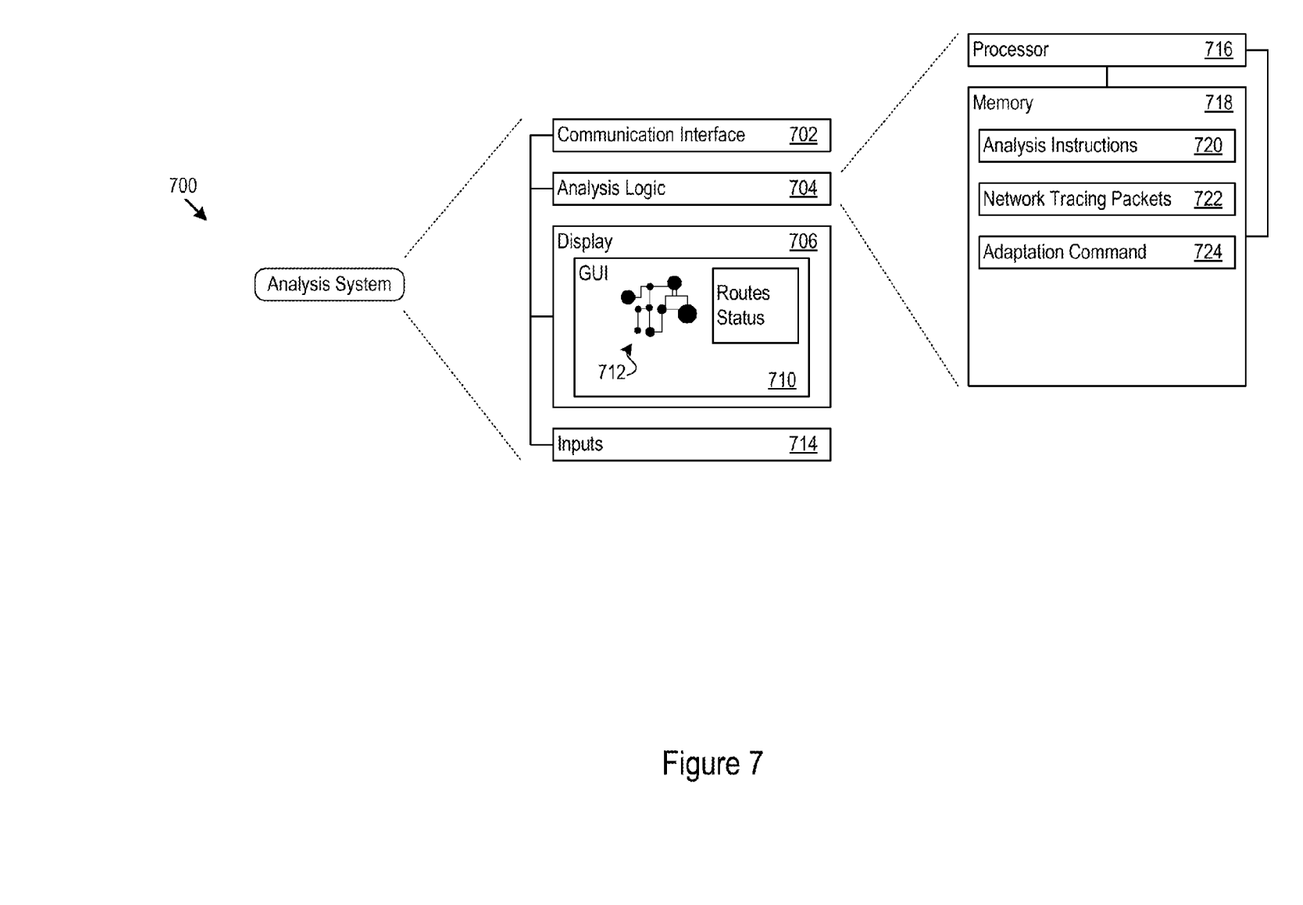
FIG. 7 shows an example analysis system.

FIG. 7 shows an example implementation of an analysis system 700. The analysis system 700 includes a communication interface 702, analysis logic 704, and a user interface 706. The communication interface 702 may include one or more Ethernet ports, WiFi transceivers, or any other type of wired or wireless communication interface. The communication interface 702 receives network tracing packets.

The user interface 706 may display, for example, a graphical user interface (GUI) 710. The user interface 706 may accept network management parameters, network tracing analysis commands, and display through the GUI 710 any type of network management interface 712, including management dashboards. The network management interface 712 may visualize, as just a few examples, the number of paths through the network from a source to a destination, the latency along each path, the topology of the paths through the network, the latency through individual network devices along any path, or any other network device state information included in the network tracing packets as network tracing information. The network tracing information in the network tracing packets provides input to the visualization and analysis that the analysis logic 700 may carry out. The user inputs 714 provide keyboard, mouse, voice recognition, touchscreen, and any other type of input mechanisms for operator interaction with the analysis system 700.

The analysis system 700 may be implemented in hardware, software, or both. In one implementation, the analysis system 700 includes one or more processors 716 and memories 718. The memory 718 may store analysis instructions 720 (e.g., program instructions) for execution by the processor 716. The memory 718 may also store the received network tracing packets 722 received at the communication interface 702.

As will be described in more detail below, the analysis instructions may generate adaptation commands 724. The analysis system 700 may send the adaptation commands 724 to any network device (not just network devices that provided network tracing information). The adaptation commands 724 may, as just a few examples: cause a change in the way that packets are processed in any network device, change the way packets are routed through the network, request further tracing information from the network device, or cause any other adaptation. Some examples are described further below.

Said another way, the memory 718 holds network tracing packets 722 received from one or more switching devices in a network that connects a source device to a destination device. The memory 718 also includes analysis instructions 720 operable to, when executed by the processor 716, recover tracing information from the network tracing packets 722. The tracing information may include network device information for one or more network devices in the network that route packets between the source device and the destination device. The tracing information may be information that is otherwise unavailable or otherwise unknown to one or more of the source device, destination device, or analysis system.

The analysis instructions 720 may generate a user interface 710 that, for example, includes a mapping of the routed paths through the network devices in the network. The user interface 710 may also display power, delay, latency, buffer levels, or any other characteristic of any of the network devices. The analysis instructions 720 may also receive an adaptation input from the user interface 710 and in response generate an adaptation command 724. The analysis instructions 720 may communicate the adaptation command 724 to any one or more of the network devices.

The analysis system 700 generates user interfaces that help understand, in detail and at very granular levels, the operation of the network through which packets flow. As just a few examples, the analysis system 702 may generate user interfaces that display each of the routed paths from a source to a destination, time series traces of per-device power consumption, buffer fill levels, and switching latency. As another example, the user interfaces may display hop-by-hop delay, in which, for example, any network device may be designated as a hop along the packet path from source to destination. The user interfaces facilitate aggressive application tuning as well as aggressive network tuning. As one use case example, an analysis system operator may tune map-reduce jobs that rely on packet flow through the network, upon analysis of tracing information in the packets.

The analysis system 700 may, either automatically or under operator control, tune any of the network devices using the tracing information as a feedback mechanism. The tuning may be done in real time, or in response to operator input. The tuning may be dynamic, changing over time to meet desired service levels (e.g., to consistently meet latency requirements specified by customers). Thus, the tracing analysis capabilities provide additional information for existing data centers to debug their infrastructure, and provide deep inside into even individual network device (e.g., switch) performance, in a fine grained manner.

Figure 8:
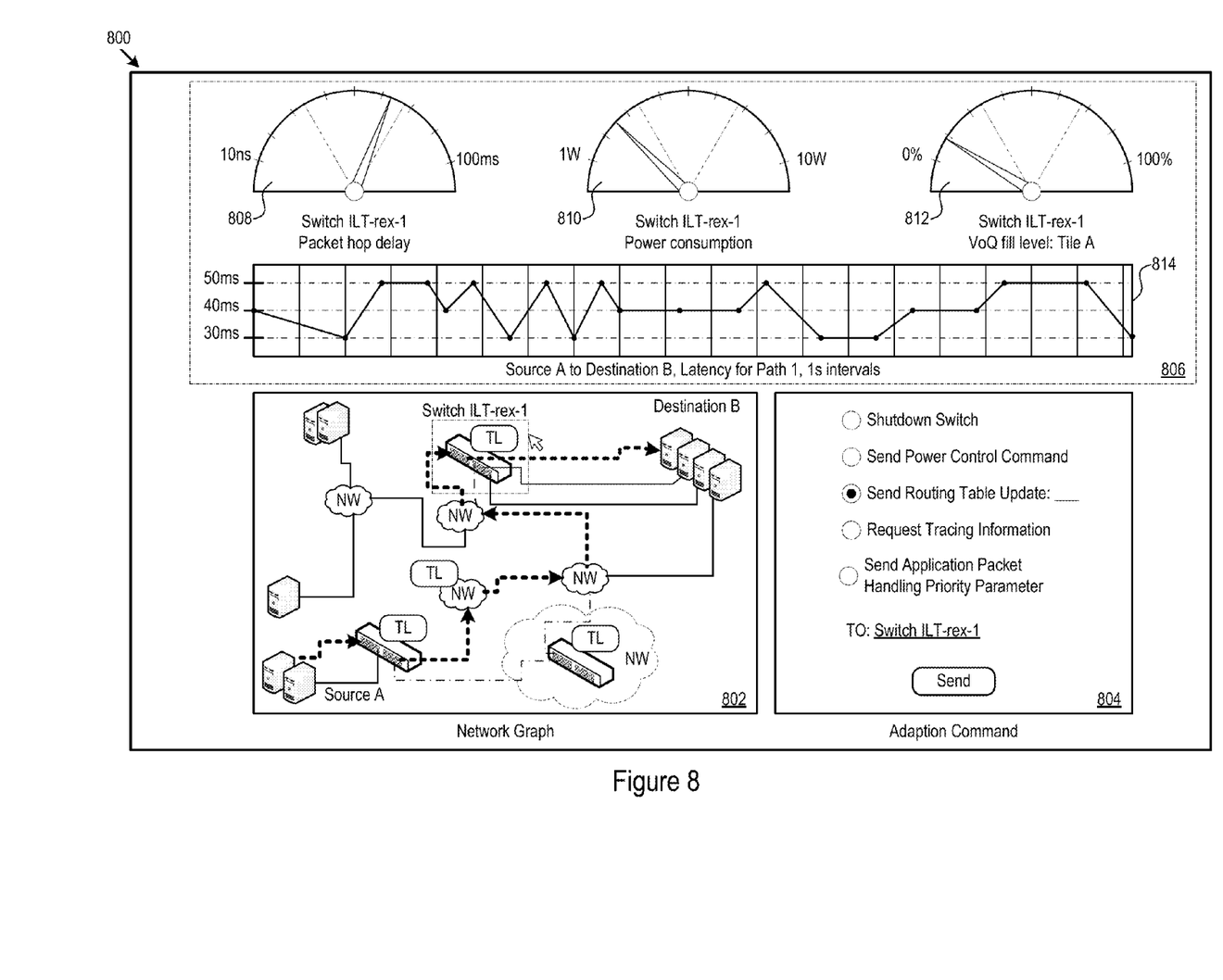
FIG. 8 shows an example network tracing dashboard.

FIG. 8 shows an example network tracing dashboard 800 ("dashboard 800"). The analysis system 700 may generate any number or type of such dashboards on the GUI 710, for the review, analysis, and adaptation of any aspect of network performance. The dashboard 800 includes any desired reporting widgets, graphs, text, or other user interface elements or other representations or views for reporting characteristics of the networks through which packets travel, at any desired level of granularity from the individual network devices, up to the network as a whole. The network tracing information in the network tracing packets conveys the information to the analysis system 700 that drives the display, analysis, and adaptation of the network.

In the particular example of the dashboard 800 that is shown, a network graph 802 shows the network topology (or any selected part of the network topology) and the individual devices in the network topology (or any selected network devices in the network). Tracing logic is abbreviated "TL", and network is abbreviated "NW". The dashboard 800 also includes an adaptation command interface 804, and a reporting interface 806. The reporting interface 806, in this example, shows a hop delay gauge 808, a power consumption gauge 810, and a VoQ fill level gauge 812. In this example, the operator has selected switch ID# ILT-rex-1 for review from the network graph 802.

The reporting interface 806 further includes a latency graph 814, which, in this example, shows the latency along Path 1 between the Source A and the Destination B, which were selected from the network graph 802. Any GUI elements in the reporting interface 806 may be added, removed, or changed to present any selected view of network characteristics at any level of granularity. As one example, instead of latency between Source A and Destination B along path 1, the GUI may instead display differential latency between two different paths through the network.

The adaptation command interface 804 provides one example mechanism for the operator to push adaptation commands into the network. In the example shown, the operator has chosen to send a routing table update command, which may modify the routed paths through the network, to the switch ILT-rex-1. The adaptation command interface 804 may implement virtually any adaptation command for delivery to virtually any network device. As some examples, the adaptation commands may set operational parameters like maximum power consumption, minimum and maximum buffer levels, preferred or mandatory routing parameters, and packet handling parameters. The adaptation commands may shut down or start up network devices altogether. As additional examples, the adaptation commands may request specific tracing information from a network device, may set tracing schedules, or set tracing criteria.

Figure 9:
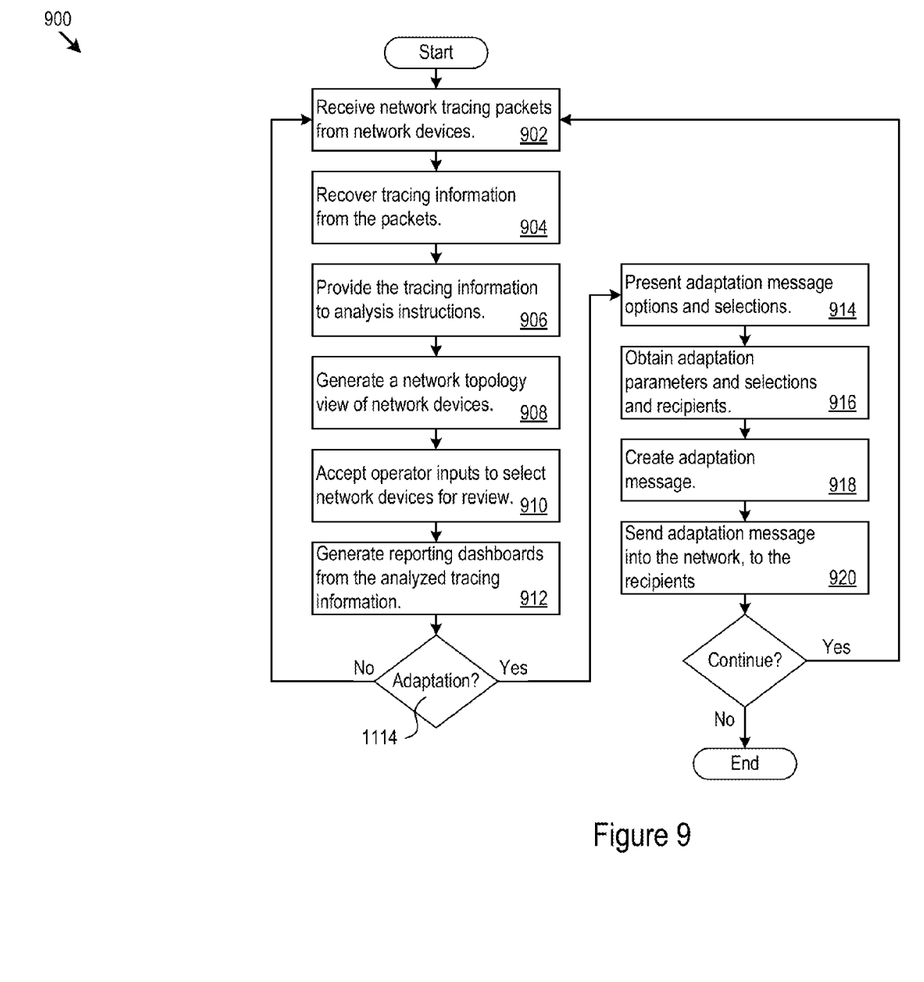
FIG. 9 shows example logic for annotated tracing driven network adaptation.

FIG. 9 shows example logic 900 for annotated tracing driven network adaptation. The analysis system 700 may, for example, implement the logic 900 in the analysis instructions 720, for example.

The logic 900 receives annotated packets from network devices (902), and recovers the tracing information from the annotated packets (904). The logic 900 saves the tracing information in memory (and optionally in profiling databases for historical data capture, for example). The tracing information is thereby provided to the analysis instructions to operate on (906).

The logic 900 may generate, for example, a network topology 802 diagram that displays the various network devices of interest (908). The logic 900 may accept operator inputs to select network devices for review (910). In response to the operator inputs, the logic 900 may generate reporting dashboards from the tracing information, whether or not processed in any manner by the analysis instructions (912).

The operator may further specify whether to perform a network adaptation (914). If so, the logic 900 may present adaptation message options and parameter selections (916), and obtain selections from the operator (918). The logic 900 then creates an adaptation message (920). The logic 900 sends the adaptation message to any specified recipients (922). The recipient may be a single network device, or may be multiple network devices. The adaptation message may be delivered by unicast, multicast, or broadcast delivery, or in other ways.

In other implementations, the logic 900 performs automated monitoring and adaptation. For example, service level agreement metrics (e.g., maximum packet hop latency or maximum power consumption) may be present in the analysis system. The logic 900 may then obtain tracing information, derive performance metrics, and compare the performance metrics to the agreed metrics. When adaptation may help to meet the agreed metrics, the logic 900 may automatically generate and send adaptation messages to any network devices for the purpose of modifying network behavior toward compliance with the agreed metrics.

As discussed above, the tracing logic 202 may facilitate tracing of any path between a source and a destination. It may do so, for example, by determining a set of next hop-destinations, and sending a tracing packet to all or some of the next-hop destinations. The tracing logic 202 may facilitate tracing network paths handled, defined, or established at any layer in the Open Systems Interconnection (OSI) model. As examples, such paths may be defined at, or may be characterized by parameters relevant at the OSI L2 data link layer (e.g., paths determined by hardware addresses, such as Ethernet addresses) or the OSI L3 network layer (e.g., paths determined by IP addresses), or defined according to criteria established in models other than the OSI model.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
in a network device that connects a source device to a destination device through the network device:
receiving, by the network device, a network tracing packet that was sent by a different network device, the network tracing packet being directed to trace an outgoing network path; and
executing network tracing, wherein the network tracing comprises:
determining a new set of network paths outgoing from the network device toward the destination device;
selecting a set of network paths to trace from among the new set of network paths;
creating a set of outgoing network tracing packets comprising an outgoing network tracing packet corresponding to each network path in the selected set of network paths; and
sending an outgoing network tracing packet along each network path in the selected set of network paths.

2. The method of claim 1, further comprising:
replicating the received network tracing packet to create the outgoing network tracing packets.

3. The method of claim 2, further comprising:
adding tracing information to the outgoing network tracing packets prior to sending the outgoing network tracing packets down each network path.

4. The method of claim 2, wherein the received network tracing packet comprises an injected tracing packet added into a network flow by a device other than the network device.

5. The method of claim 1, further comprising:
sending the received network tracing packet down the outgoing network path that the received network tracing packet is directed to trace.

6. The method of claim 1, further comprising:
generating at least one of the outgoing network tracing packets within the network device itself, without replicating a received packet for use as an outgoing network tracing packet.

7. The method of claim 1, further comprising:
receiving tracing configuration information; and
initiating, by the network device, the network tracing based on the tracing configuration information.

8. The method of claim 7,
wherein the tracing configuration information comprises a maximum number of network paths permitted in the selected set of network paths.

9. The method of claim 7,
wherein the tracing configuration information comprises a maximum number of consecutive hops an outgoing network tracing packet is permitted to take.

10. The method of claim 7,
wherein the tracing configuration information initiates the network tracing in response to the destination device being at least a predetermined number of network hops away from the network device.

11. The method of claim 7,
wherein the tracing configuration information initiates the network tracing in response to an operational parameter of the network device meeting a predetermined device condition included in the tracing configuration information.

12. The method of claim 11, wherein the device condition comprises at least one of: a buffer level has exceeded a buffer threshold, latency through the network device has exceeded a latency threshold, power consumption in the network device has exceeded a power consumption threshold, or a combination thereof.

13. A network device comprising:
an input buffer operable to receive a packet from a source device;
an output buffer operable to hold an outgoing packet to a destination device;
tracing circuitry connected to the input buffer and the output buffer, the tracing circuitry configured to:
determine multiple paths available for a packet to travel from the network device to the destination device;
despite routing information in the network device specifying a particular path for the packet to the destination device, determine a selection of paths from among the multiple paths for tracing;
create an outgoing network tracing packet to send down each path of the selection of paths; and
send an outgoing network tracing packet down each path of the selection of paths.

14. The device of claim 13, wherein the tracing circuitry is further configured to:
generate the outgoing network tracing packet internally in the network device, without replicating a received packet for use as the outgoing network tracing packet.

15. The device of claim 13, wherein the tracing circuitry is further configured to:
generate the outgoing network tracing packet by replicating a received packet.

16. The device of claim 13, wherein the tracing circuitry is further configured to:
recognize a received packet as a tracing packet received from a different network device; and
determine to continue tracing in response to receipt of the tracing packet.

17. The device of claim 16, wherein the tracing circuitry is further configured to:
generate the outgoing network tracing packet by replicating the tracing packet received from the different network device.

18. A device comprising:
a packet buffer in a network device, the packet buffer comprising a network packet received from a source network device and destined for a destination network device;
tracing circuitry connected to the packet buffer, the tracing circuitry configured to:
obtain tracing execution criteria;

evaluate the tracing execution criteria to determine whether to execute network tracing toward the destination network device;

in response to the network tracing being executed based on the tracing execution criteria, and with respect to the destination network device for the network packet:

determine selected network paths to trace from among multiple network paths supported by the network device toward the destination network; and send an outgoing network tracing packet down each selected network path.

19. The device of claim 18, wherein the tracing circuitry is further configured to:

generate the outgoing network tracing packets without replicating a received packet for use for the outgoing network tracing packets.

20. The device of claim 18, wherein the tracing circuitry is further configured to:

generate the outgoing network tracing packets by replicating a received packet.

* * * * *